(12) United States Patent
Yamamoto et al.

(10) Patent No.: US 9,712,701 B2
(45) Date of Patent: Jul. 18, 2017

(54) SHEET CONVEYANCE DEVICE, IMAGE READING DEVICE, IMAGE FORMING APPARATUS, AND SENSOR UNIT

(71) Applicant: CANON KABUSHIKI KAISHA, Tokyo (JP)

(72) Inventors: Yuichi Yamamoto, Toride (JP); Akira Matsumoto, Toride (JP); Masahito Ikeda, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/052,535

(22) Filed: Feb. 24, 2016

(65) Prior Publication Data
US 2016/0255225 A1  Sep. 1, 2016

(30) Foreign Application Priority Data

Feb. 26, 2015 (JP) ................. 2015-037026

(51) Int. Cl.
| | | |
|---|---|---|
| H04N 1/04 | (2006.01) | |
| H04N 1/00 | (2006.01) | |
| B65H 7/12 | (2006.01) | |
| B65H 5/38 | (2006.01) | |
| B65H 7/14 | (2006.01) | |

(52) U.S. Cl.
CPC .......... *H04N 1/00615* (2013.01); *B65H 5/38* (2013.01); *B65H 7/125* (2013.01); *B65H 7/14* (2013.01); *H04N 1/0062* (2013.01); *H04N 1/00602* (2013.01); *H04N 1/00795* (2013.01); *B65H 2404/6111* (2013.01); *B65H 2553/30* (2013.01); *B65H 2553/80* (2013.01); *B65H 2557/30* (2013.01); *B65H 2601/26* (2013.01); *B65H 2801/06* (2013.01); *H04N 2201/0094* (2013.01)

(58) Field of Classification Search
CPC .......... B65H 2220/02; B65H 2511/524; B65H 2513/50; B65H 2515/32; B65H 2220/01; B65H 2403/724; B65H 2403/732; B65H 3/5261; B65H 7/12; G03G 15/5062; G03G 15/6511; G03G 2215/00042; G03G 2215/00333
USPC .......... 271/10.09, 10.11, 122, 125; 358/474, 358/498, 513; 399/18, 367, 388, 49, 72
See application file for complete search history.

(56) References Cited

U.S. PATENT DOCUMENTS

| | | | | |
|---|---|---|---|---|
| 5,119,213 A * | 6/1992 | Graves | ............... | H04N 1/00681 235/375 |
| 6,687,471 B2 * | 2/2004 | Sakata | ............... | G03G 15/5062 399/49 |
| 7,822,376 B2 * | 10/2010 | Nagano | ............... | G03G 15/6511 399/18 |
| 7,905,484 B2 | 3/2011 | Komuro | | |
| 8,654,417 B2 * | 2/2014 | Okada | ................ | H04N 1/00915 358/474 |
| 8,678,372 B2 * | 3/2014 | Yasukawa | ................ | B65H 7/12 271/10.09 |

(Continued)

*Primary Examiner* — Negussie Worku
(74) *Attorney, Agent, or Firm* — Canon U.S.A., Inc. IP Division

(57) ABSTRACT

A double feed detection sensor unit includes a double feed detection sensor for detecting a document via a hole on a conveyance guide, a control circuit board on which the double feed detection sensor and an element are provided, and a protection member provided to cover the element.

22 Claims, 8 Drawing Sheets

(56) References Cited

U.S. PATENT DOCUMENTS

| | | | | |
|---|---|---|---|---|
| 2001/0015518 | A1* | 8/2001 | Yamamoto | B65H 3/0615 271/10.04 |
| 2002/0176115 | A1* | 11/2002 | Yamamoto | H04N 1/00578 358/400 |
| 2006/0227389 | A1* | 10/2006 | Yamamoto | H04N 1/2032 358/496 |
| 2008/0296825 | A1* | 12/2008 | Kato | B42C 1/12 270/1.01 |
| 2008/0298929 | A1* | 12/2008 | Hirai | B42C 9/0081 412/37 |
| 2009/0224462 | A1* | 9/2009 | Yamamoto | B65H 1/14 271/18 |

* cited by examiner

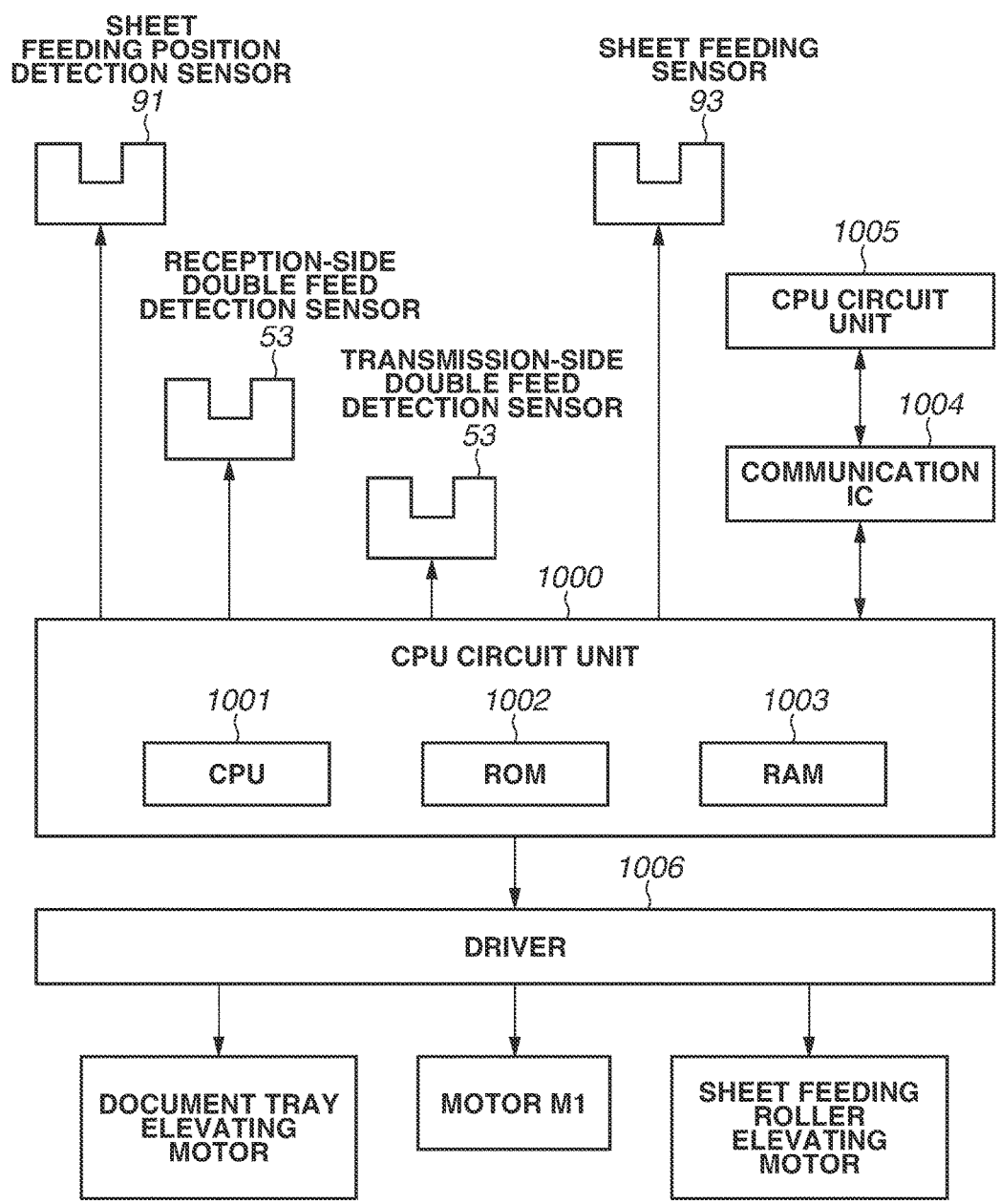

SHEET CONVEYANCE DEVICE, IMAGE READING DEVICE, IMAGE FORMING APPARATUS, AND SENSOR UNIT

BACKGROUND

Field

Aspects of the present invention generally relate to a sheet conveyance device, and an image reading device and an image forming apparatus that include the sheet conveyance device.

Description of the Related Art

A sheet conveyance device applied to an image reading device and an image forming apparatus conveys sheets such as document sheets and recording media separated one by one by a sheet feeding unit. There is proposed a conventional sheet conveyance device that detects double-fed sheets (a plurality of sheets simultaneously fed) which have failed to be separated by a sheet feeding unit, using a double feed detection sensor provided in a conveyance path (refer to U.S. Pat. No. 7,905,484). In general, when double feed is detected using a double feed detection sensor, a user is notified of the double feed so as to be prompted to take out the double-fed sheets.

In a double feed detection unit used in a sheet conveyance device of this type, a transmission-side double feed detection sensor and a reception-side double feed detection sensor are generally disposed to face each other across a conveyance path. In the double feed detection unit, the reception-side double feed detection sensor receives an ultrasonic wave signal transmitted from the transmission-side double feed detection sensor. The double feed detection unit detects the presence or absence of double-fed sheets based on the amplitude change in the received ultrasonic wave.

A conveyance guide for forming the conveyance path is provided with a hole for letting through an ultrasonic wave transmitted and received between the double feed detection sensors. Each double feed detection sensor is disposed in accordance with the position of the hole. The transmission-side double feed detection sensor includes a sensor unit (element) for transmitting an ultrasonic wave and a control circuit board for controlling the sensor. The reception-side double feed detection sensor includes a sensor unit for receiving an ultrasonic wave and a control circuit board for controlling the sensor. The control circuit boards with the respective sensors mounted thereon are each provided with elements for operating the sensor, such as capacitors.

However, in the above-described configuration in which the conveyance guide is provided with a hole at a portion corresponding to the double feed detection sensor, a foreign object such as a staple and a clip accidentally entered the conveyance path may possibly drop through the hole. A foreign object dropped on the control circuit board of the double feed detection sensor may cause malfunction of the control circuit board, such as short-circuit and breakage.

One possible countermeasure for preventing the malfunction caused by a dropped foreign object, such as short-circuit and breakage, is to stick a protection member such as an adhesive tape on the circuit board. However, when an adhesive tape is used, there is a possibility that an adhesive surface may deteriorate over time by the influence of temperature and humidity changes, and the tape may peel off from the control circuit board. Sticking a tape on the control circuit board causes a problem of an increase in the manufacturing cost since it is necessary to ensure a high sticking position accuracy to stick the tape at an accurate position. Therefore, the method for sticking a tape is not an adequate countermeasure.

SUMMARY

An aspect of the present invention is generally directed to a configuration for protecting a control circuit board of a double feed detection sensor without degrading the function of the sensor and for preventing short-circuit and breakage of the control circuit board even if a foreign object drops through a hole formed on a conveyance guide.

According to an aspect of the present invention, a sheet conveyance device includes a sheet stacking portion on which sheets are stacked, a sheet feeding unit configured to feed sheets stacked on the sheet stacking portion, a conveyance guide disposed on a downstream side of the sheet feeding unit in a sheet conveyance direction, and a sensor unit disposed under the conveyance guide, the sensor unit including a sensor configured to detect a sheet conveyed along the conveyance guide via an opening formed on the conveyance guide, a control circuit board on which the sensor and an element are provided, and a protection member provided to cover the element, wherein the protection member includes a hole portion, wherein the sensor is inserted into the hole portion.

Further features of aspects of the present invention will become apparent from the following description of exemplary embodiments with reference to the attached drawings.

BRIEF DESCRIPTION OF THE DRAWINGS

FIG. 4 is a block diagram illustrating a configuration of a control unit of a sheet processing unit according to an exemplary embodiment.

DESCRIPTION OF THE EMBODIMENTS

An exemplary embodiment will be described below with reference to FIGS. 1 to 8.

In the following exemplary embodiment, the description will be given using, as an example, an image forming apparatus including a document feeding device and an image reading device that can read image information on a sheet, as a sheet conveyance device. A copying machine will be described as an example of the image forming apparatus.

Figure 1:
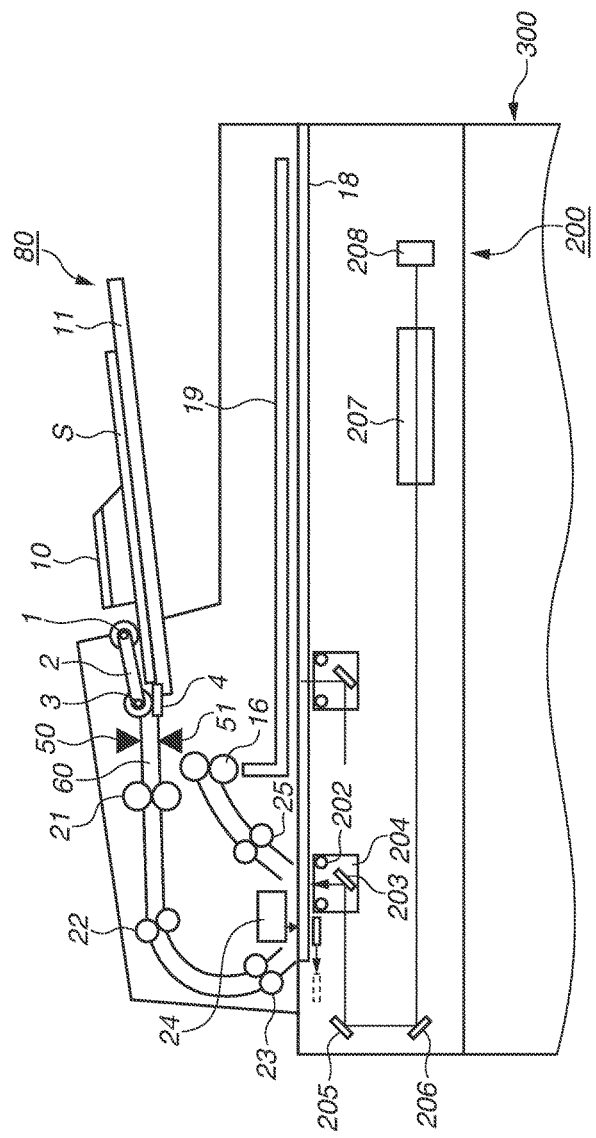
FIG. 1 is a sectional view illustrating an image reading device according an exemplary embodiment.
Figure 2:
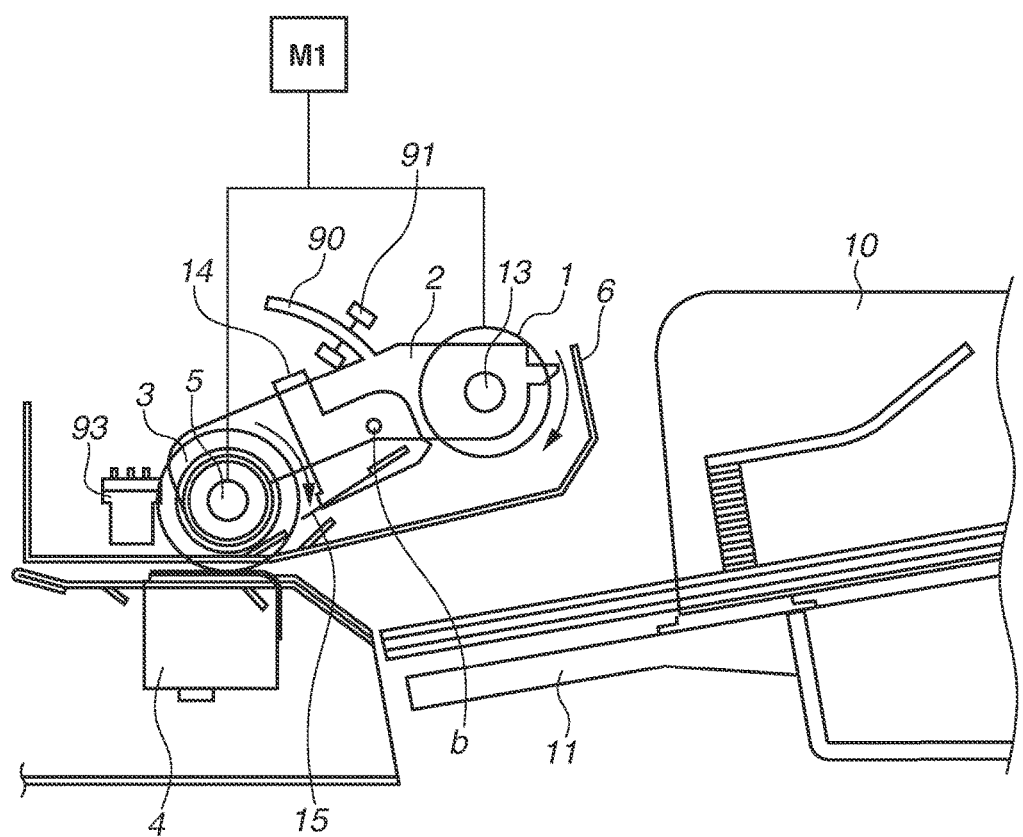
FIG. 2 is a sectional view illustrating a sheet feeding unit and a separation unit of a sheet conveyance device according to an exemplary embodiment.
Figure 3:
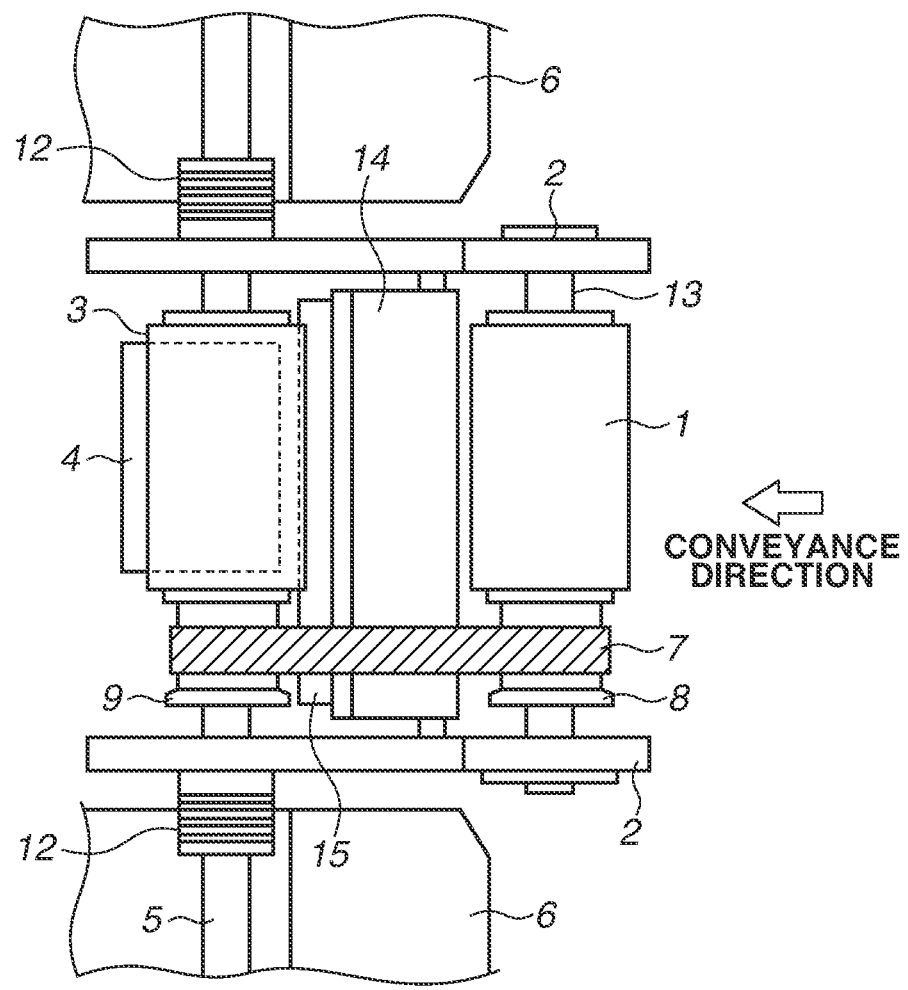
FIG. 3 is a plan view illustrating the sheet feeding unit and the separation unit of the sheet conveyance device according to an exemplary embodiment.
Figure 5A:
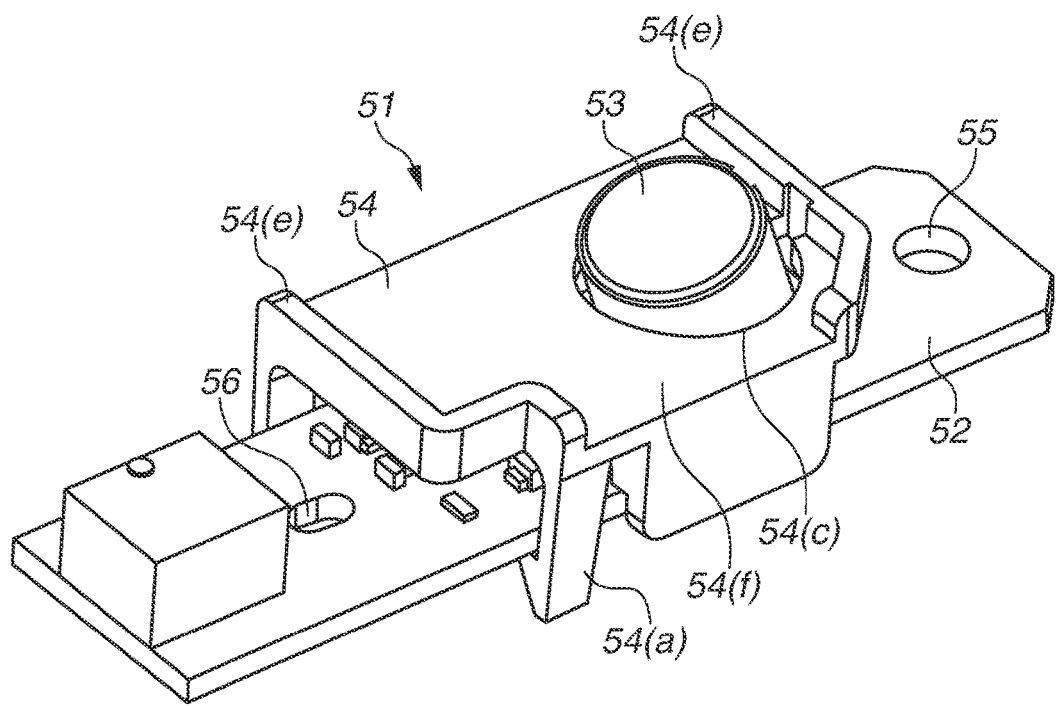
FIG. 5A is a perspective view illustrating a double feed detection sensor unit according to an exemplary embodiment of the present invention.
Figure 5B:
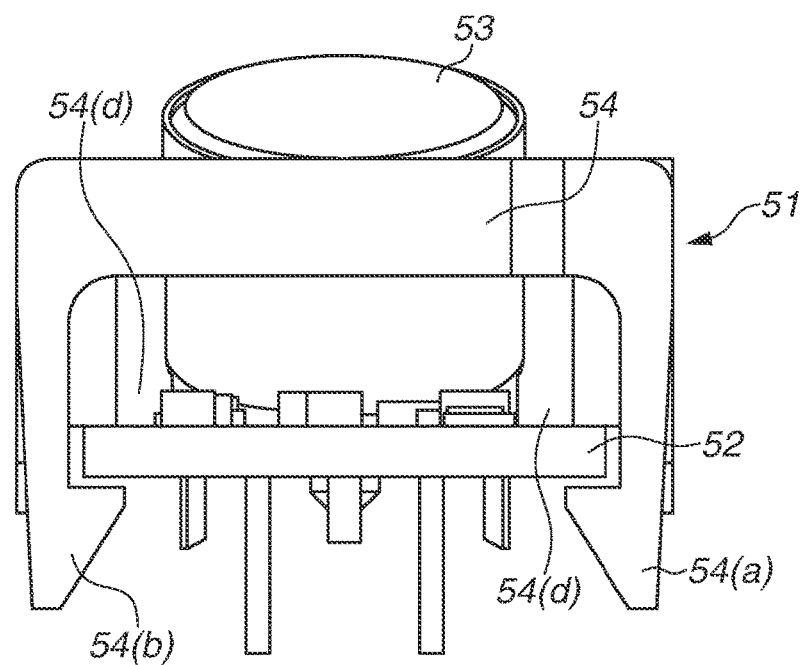
FIG. 5B is a side view illustrating the double feed detection sensor unit according to an exemplary embodiment.
Figure 6:
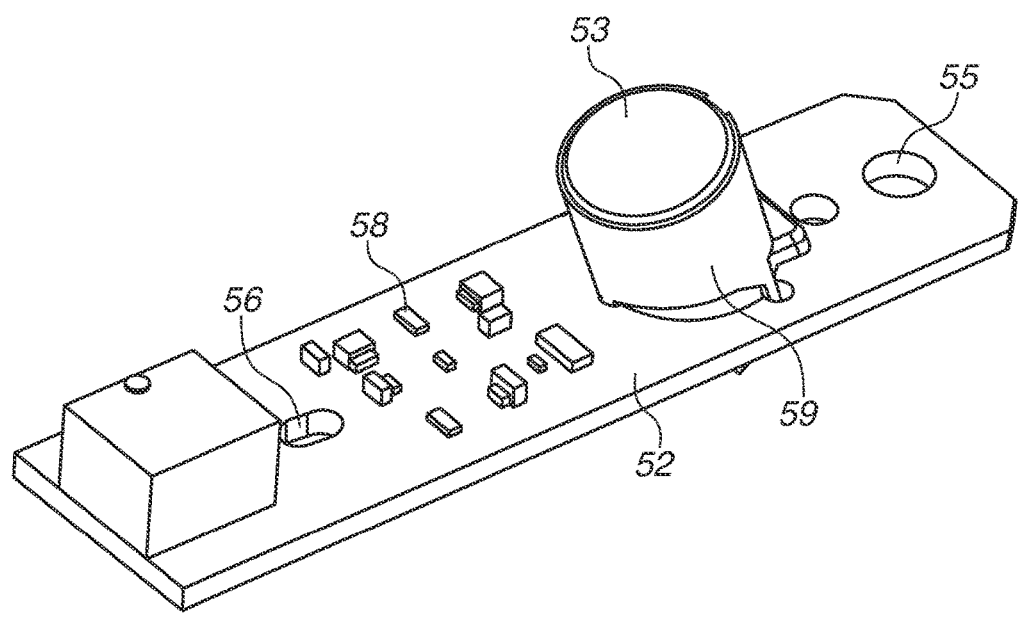
FIG. 6 is a perspective view illustrating a control circuit board of the double feed detection sensor unit according to an exemplary embodiment.
Figure 7:
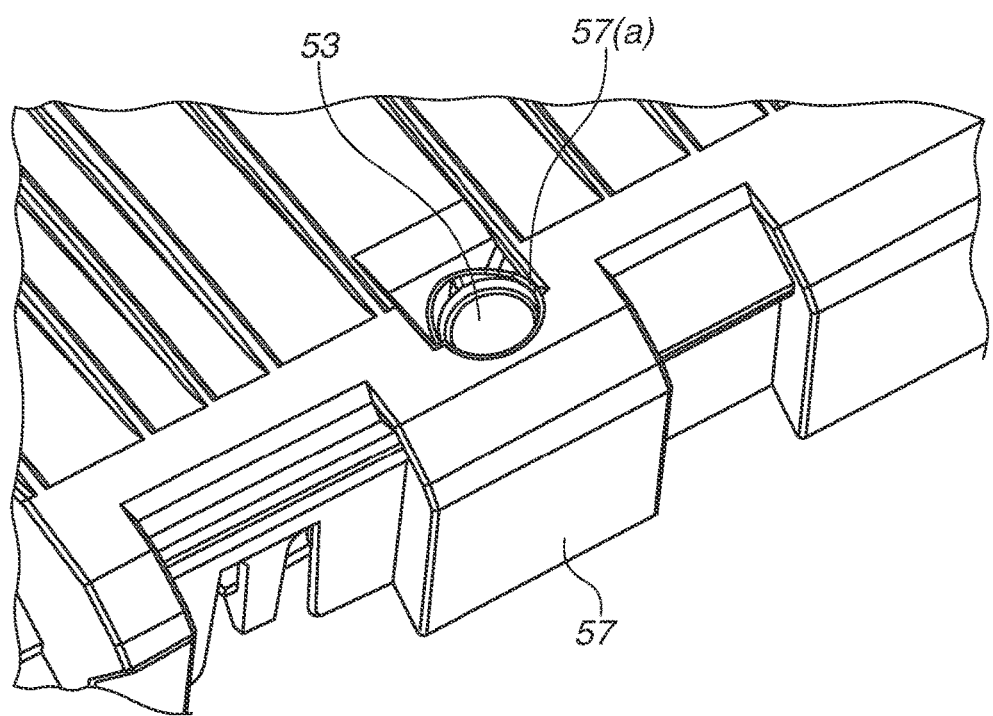
FIG. 7 is a perspective view illustrating the double feed detection sensor unit and a conveyance guide according to aspects of the present invention.
Figure 8:
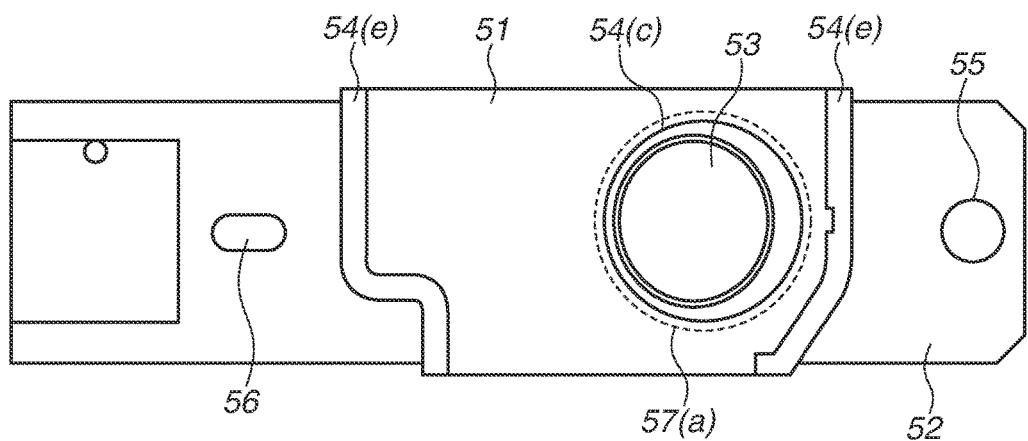
FIG. 8 is a top view illustrating a protection member according to an exemplary embodiment.

The following describes an image forming apparatus including an image reading device according to the exemplary embodiment. FIG. 1 is a sectional view illustrating the image reading device according to the exemplary embodiment. FIG. 2 is a sectional view illustrating a sheet feeding unit and a separation unit of a sheet conveyance device according to the exemplary embodiment. FIG. 3 is a plan view illustrating the sheet feeding unit and the separation unit of the sheet conveyance device according to the exemplary embodiment. FIG. 4 is a block diagram illustrating a configuration of a control unit of a sheet processing unit according to the exemplary embodiment. FIG. 5A is a perspective view illustrating a double feed detection sensor unit according to the exemplary embodiment, and FIG. 5B is a side view illustrating the double feed detection sensor unit according to the exemplary embodiment. FIG. 6 is a perspective view illustrating a control circuit board of the double feed detection sensor unit according to the exemplary embodiment. FIG. 7 is a perspective view illustrating the double feed detection sensor unit and a conveyance guide according to the exemplary embodiment. FIG. 8 is a top view illustrating a protection member according to the exemplary embodiment.

(Image Reading Device)

The image forming apparatus including the image reading device will be described below with reference to FIGS. 1 to 7. As illustrated in FIG. 1, the main body of a copying machine as an image forming apparatus includes an image input unit 200 and an image output unit 300.

The image output unit 300 performs image formation based on a known electrophotographic process. The image output unit 300 includes a photosensitive member, an exposure device, a developing device, a transfer device, and a fixing device, as an image forming unit. The exposure device forms an electrostatic latent image on the photosensitive member based on image information acquired by the image input unit 200. The developing device develops the electrostatic latent image as a developer image using toner. The transfer device transfers the developer image onto a conveyed recording medium. The fixing device fixes onto the recording medium the developer image on the recording medium.

The image reading device includes the image input unit 200 and an automatic document feeder (ADF) 80 serving as a sheet conveyance device. The ADF 80 feeds document sheets S to be read, onto a platen 18 (clear glass) one by one. The ADF 80 is configured to be openable and closable with respect to the image input unit 200, and to press the document sheet S placed on the platen 18. The image input unit 200 optically reads an image on a moving document sheet being conveyed by the ADF 80 or a stationary document sheet placed on the platen 18, and performs photoelectric conversion to input the obtained data as image information.

As illustrated in FIG. 1, the image reading device includes a contact image sensor 24 serving as a first reading unit for reading an image on one side of a moving document sheet being conveyed on the platen 18. The contact image sensor 24 is fixed to a predetermined position (position illustrated in FIG. 1) on the side of the ADF 80, and reads an image on one side of a moving document sheet being conveyed on the platen 18.

The image reading device further includes a second reading unit for reading an image on the other side of the document sheet. The second reading unit includes a movable scanner unit 204 including a lamp 202 and a mirror 203, mirrors 205 and 206, a lens 207, and an image sensor 208. The second reading unit is disposed on the side of the image input unit 200. The second reading unit stops the scanner unit 204 at a predetermined position (position illustrated with solid lines in FIG. 1), and reads an image on the other side of a moving document sheet being conveyed on the platen 18 above the scanner unit 204. The second reading unit can also read an image on the other side of a stationary document sheet placed on the platen 18 while moving the scanner unit 204 along the platen 18.

The ADF 80 is provided with a document tray 11 serving as a sheet stacking portion, at an upper position. The document sheets S on the document tray 11 are sequentially fed out in order from the top document sheet by a sheet feeding roller 1 serving as a sheet feeding unit. The fed-out document sheets S are separated and fed one by one by a separation-conveyance roller 3 and a separation pad 4. When the document sheet S separated and fed passes through the platen 18 of the image input unit 200, either or both of the scanner unit 204 and the contact image sensor 24 read(s) an image. The document sheet S from which the image has been read is discharged onto a discharge tray 19 by a discharge roller pair 16.

As illustrated in FIG. 2, the document tray 11 is provided with document width regulating plates 10 for regulating the width direction (the direction orthogonal to the conveyance direction of the document sheets S) of the document sheets S stacked on the document tray 11. The document tray 11 is configured to be elevatable around a rotation center (not illustrated) by a drive unit (not illustrated). The sheet feeding roller 1 is configured to be rotatable around a shaft 13. The sheet feeding roller 1 is further configured to be elevatable with respect to the document sheets S stacked on the document tray 11, by turning around a shaft 5 by arms 2.

The arm 2 is provided with a detected portion 90 of a sheet feeding position detection sensor 91 for detecting the elevating position of the document tray 11 (top surface position of the document sheets S). The sheet feeding position detection sensor 91 uses a photo-interrupter. When an optical axis is interrupted by the detected portion 90 (hereinafter referred to as a sensor ON state), a sheet can be fed. Conversely, when the optical axis is not interrupted by the detected portion 90 (hereinafter referred to as a sensor OFF state), the document tray 11 is raised by the drive unit (not illustrated).

Fixed guides 6 and a swing guide 14 are provided over the sheet feeding roller 1 and the separation-conveyance roller 3 to guide a document sheet S from the sheet feeding roller 1 to the separation-conveyance roller 3. The swing guide 14 is configured to be swingable around a fulcrum b, and is provided with an elastic member 15 such as a Miler (registered trademark) at the leading end on the downstream side in the conveyance direction.

As illustrated in FIG. 3, the sheet feeding roller 1 and the separation-conveyance roller 3 are provided with pulleys 8 and 9, respectively. A timing belt 7 is stretched around the pulleys 8 and 9 to transmit the drive of a motor M1 (refer to FIG. 2) to the sheet feeding roller 1. The arms 2 are urged by respective spring clutches 12. When the motor M1 normally rotates, the sheet feeding roller 1 and the separation-conveyance roller 3 rotate in the direction indicated by an arrow (refer to FIG. 2), and the arms 2 move downward. When the motor M1 normally rotates, the sheet feeding roller 1 sets down on the top surface of document sheets S on the document tray 11, and the spring clutches 12 transmit force so that the sheet feeding roller 1 applies certain fixed pressure (torque) to the top surface of the document sheets S on the document tray 11. When the motor M1 reversely rotates, the spring clutches 12 lock to raise the arms 2.

As illustrated in FIG. 1, the document sheet S separated and fed is subjected to skew correction by a registration roller pair 21 and to U-turn conveyance by conveyance roller pairs 22, 23, and 25. In the conveyance path of the document sheet S, at a portion between the conveyance roller pairs 23 and 25 where the reading unit including the contact image sensor 24 and the scanner unit 204 lies, a constant speed is set to eliminate the conveyance speed difference of the document sheet S. The document sheet S from which an image has been read is discharged onto the discharge tray 19 by the discharge roller pair 16.

The configuration of a control unit for performing drive control of the ADF 80 will be described below with reference to FIG. 4. The control unit of the ADF 80 includes a central processing unit (CPU) circuit unit 1000 including a CPU 1001, a read only memory (ROM) 1002, and a random access memory (RAM) 1003, as illustrated in FIG. 4. The CPU circuit unit 1000 communicates with a CPU circuit unit 1005 provided on the image forming apparatus main body side, via a communication integrated circuit (IC) 1004 to perform data exchange. Then, the CPU circuit unit 1000 executes various programs stored in the ROM 1002, according to instructions from the CPU circuit unit 1005 to perform drive control of the ADF 80.

When the drive control is performed, detection signals from various sensors are input to the CPU circuit unit 1000. These various sensors include double feed detection sensors 53 (described below), the sheet feeding position detection sensor 91, and a sheet feeding sensor 93.

A driver 1006 is connected to the CPU circuit unit 1000. The driver 1006 drives various motors based on signals from the CPU circuit unit 1000.

The above-described various motors include a document tray elevating motor (not illustrated) for raising and lowering the document tray 11, a sheet feeding roller elevating motor (not illustrated) for raising and lowering the sheet feeding roller 1, and the motor M1 for rotationally driving the sheet feeding roller 1 and the separation-conveyance roller 3.

These motors are stepping motors. By controlling an excitation pulse rate, a roller pair to be driven by each motor can be rotated at a constant speed or at a desired speed. Further, these motors can be normally or reversely driven by the driver 1006.

(Detailed Descriptions of Double Feed Detection Sensor Units 50 and 51)

The unit configuration of the double feed detection sensor units 50 and 51 provided in the double feed detection unit, one of features of the present invention, will be described in detail below. The double feed detection sensor units 50 and 51 are provided for detecting whether document sheets S have been separated one by one by the separation-conveyance roller 3 and the separation pad 4. As illustrated in FIG. 1, the double feed detection sensor units 50 and 51 are disposed on a conveyance path 60 on the downstream side of the separation-conveyance roller 3 and the separation pad 4 in the document conveyance direction. The conveyance path 60 is a conveyance path of the document sheet S. The transmission-side double feed detection sensor unit 51 and the reception-side double feed detection sensor unit 50 are disposed to face each other across the conveyance path 60. As a pair of sensors, the double feed detection sensor units 50 and 51 perform double feed detection. Although there are various double feed detection methods, the present exemplary embodiment employs a method of ultrasonically detecting double feed. More specifically, this method detects double feed of conveyed sheets based on the difference in signal attenuation condition between an ultrasonic wave that has passed through double-fed sheets and an ultrasonic wave that has passed through one sheet (amplitude change in the ultrasonic waves). FIGS. 5A and 5B illustrate the configuration of the transmission-side double feed detection sensor unit 51. The transmission-side double feed detection sensor unit 51 includes a double feed detection sensor 53 for transmitting an ultrasonic wave, a control circuit board 52, and a protection member 54. The reception-side double feed detection sensor unit 50 has an almost similar configuration to the transmission-side double feed detection sensor unit 51 except that the protection member 54 is not provided, and descriptions thereof will be omitted.

FIG. 7 is a perspective view illustrating the double feed detection sensor 53 and a lower conveyance guide 57. The transmission-side double feed detection sensor unit 51 is attached to the inner side of the conveyance guide 57 forming the conveyance path 60 as illustrated in FIG. 7. To prevent interruption of the ultrasonic wave signal transmitted from the transmission-side double feed detection sensor unit 51, the conveyance guide 57 is provided with a hole 57(a) (opening) formed to correspond to a portion of the double feed detection sensor 53 from which an ultrasonic wave signal is to be transmitted. The transmission-side double feed detection sensor unit 51 detects a conveyed document sheet S through the hole 57(a). The diameter of the hole 57(a) is made as small as possible to make it hard for a foreign object such as a staple and a clip that accidentally entered the conveyance path 60 to drop through the hole 57(a).

The configuration of the unit of the double feed detection sensor unit 51 (or 50) will be described below.

The double feed detection sensor 53 for transmitting (or receiving) an ultrasonic wave is disposed on the control circuit board 52 for producing an ultrasonic wave signal (mounted thereon with soldering). On the control circuit board 52 of the transmission-side double feed detection sensor unit 51, elements 58 (such as capacitors) required for transmitting an ultrasonic wave signal from the double feed detection sensor 53 is mounted in addition to the double feed detection sensor 53. The elements 58 are electrically connected to the double feed detection sensor 53. To protect the reception-side double feed detection sensor unit 50 from electrostatic, the outer circumference of the double feed detection sensor 53 is covered by a shield plate 59.

The protection member 54 is provided for protecting the elements 58 from a foreign object such as a staple and a clip that dropped through the hole 57(a) formed on the conveyance guide 57, to prevent short-circuit and breakage of the control circuit board 52. The protection member 54 is attached to the control circuit board 52 with being positioned by the double feed detection sensor 53.

A hole 54(c) serving as a hole portion formed on the protection member 54 has an approximately identical shape to the outer circumferential surface of the double feed detection sensor 53. The double feed detection sensor 53 is inserted into the hole 54(c) to penetrate through the hole 54(c). With this configuration, the double feed detection sensor 53 and the protection member 54 are positioned. Positioning refers a state where the position of the protection member 54 is restrained by the position of the double feed detection sensor 53. At the same time, the protection member 54 is also positioned with respect to the control circuit board 52 by the double feed detection sensor 53. In the present exemplary embodiment, since the hole 54(c) is made slightly larger than the double feed detection sensor 53, there is some clearance (small gap) between the double feed detection sensor 53 and the protection member 54.

The protection member 54 and the control circuit board 52 are attached in such a way that abutting portions 54(*d*) extending from an upper surface 54(*f*) of the protection member 54 are caused to abut the upper surface of the control circuit board 52, and claw-shaped engaging portions 54(*a*) and 54(*b*) extending from the upper surface 54(*f*) are engaged with the under surface of the control circuit board 52. As illustrated in FIG. 8, when the protection member 54 is viewed from above, the hole 54(*c*) formed on the protection member 54 is made smaller than the hole 57(*a*) formed on the conveyance guide 57.

The double feed detection sensor unit 51 (or 50) is attached to the conveyance guide 57 in such a way that positioning/attachment bosses (not illustrated) of the conveyance guide 57 are respectively inserted into a hole 55 and an oblong hole 56 that are formed on the control circuit board 52.

As described above, the protection member 54 is configured to be positioned by the double feed detection sensor 53 corresponding to the hole 57(*a*) of the conveyance guide 57, and attached to the control circuit board 52. Thus, the dimension of the hole 54(*c*) of the protection member 54 can be made as small as possible. This can reduce the gap between the double feed detection sensor 53 and the hole 54(*c*) of the protection member 54. Therefore, even if a foreign object drops through the hole 57(*a*) of the conveyance guide 57, the foreign object can be prevented from reaching the control circuit board 52 through the gap between the double feed detection sensor 53 and the hole 54(*c*) of the protection member 54. Therefore, it is possible to prevent a foreign object from contacting the elements 58 on the control circuit board 52 and thus prevent short-circuit and breakage of the double feed detection sensor unit 51 (or 50).

Consideration will be given to a case where the hole 54(*c*) of the protection member 54 is positioned not by the double feed detection sensor 53 but by another member serving as a positioning member, unlike the present exemplary embodiment. In this case, it is necessary to consider variations in manufacturing of the protection member 54 and the hole 54(*c*), variations in manufacturing of the control circuit board 52 and the double feed detection sensor 53, and variations in the distance between the positioning member for positioning the protection member 54 and the positioning member for positioning the control circuit board 52. Therefore, it is necessary to set the hole 54(*c*) of the protection member 54 larger than that in the present exemplary embodiment.

Further, the protection member 54 is provided with wall portions 54(*e*) protruding from the upper surface 54(*f*) of the protection member 54. The wall portions 54(*e*) are provided for preventing a foreign object that dropped onto the upper surface 54(*f*) of the protection member 54 through the hole 57(*a*) formed on the conveyance guide 57, from further dropping onto the control circuit board 52. More specifically, as illustrated in FIG. 8, the wall portions 54(*e*) are formed at outer positions than the hole 57(*a*) formed on the conveyance guide 57 when the protection member 54 is viewed from above. With this configuration, even if a foreign object drops onto the protection member 54 through the hole 57(*a*) formed on the conveyance guide 57, the foreign object will first drop onto the upper surface 54(*f*) of the protection member 54. Then, even if the foreign object slides on the upper surface 54(*f*), it is blocked by the wall portions 54(*e*) and therefore does not drop onto the control circuit board 52.

Although the protection member 54 provided in the transmission-side double feed detection sensor unit 51 has been described in the above exemplary embodiment, the configuration is not limited thereto. When the reception-side double feed detection sensor unit 50 is disposed under the conveyance guide 57, the reception-side double feed detection sensor unit 50 is preferably provided with the protection member 54 as described in the present exemplary embodiment.

Although all of the elements 58 disposed on the control circuit board 52 are covered by the protection member 54 in the above-described exemplary embodiment, the configuration is not limited thereto. The protection member 54 may be provided to cover some of the elements 58 on the control circuit board 52 that are disposed at positions onto which a foreign object is highly likely to drop through the hole 57(*a*) of the conveyance guide 57.

Although a method of attaching the protection member 54 by using the abutting portions 54(*d*) and the claw-shaped engaging portions 54(*a*) and 54(*b*) that extend from the protection member 54 has been described as an example in the above exemplary embodiment, aspects of the present invention are not limited thereto. For example, the protection member 54 may be fixed through fastening using screws or adhesion with ultraviolet (UV) curable resin. Also in this case, similar effects can be acquired by applying aspects of the present invention.

Although the hole 57(*a*) formed on the conveyance guide 57 does not cover the double feed detection sensor 53 at all in the above-described exemplary embodiment, the configuration is not limited thereto. For example, even in a case where a region of the hole 57(*a*) of the conveyance guide 57 is provided with a portion that partially covers the double feed detection sensor 53 so that a foreign object does not easily drop from the hole 57(*a*), the protection member 54 according to the present exemplary embodiment is applicable if the hole is large to such an extent that a foreign object may possibly drop through it. Nevertheless, to avoid affecting the ultrasonic wave signal transmitted from the double feed detection sensor 53, it is desirable that the protection member 54 has a shape that does not cover the hole 57(*a*), as in the above-described exemplary embodiment.

Although the double feed detection sensor 53 has been described as an example of a sensor unit in the above exemplary embodiment, aspects of the present invention are not limited thereto. The sensor unit does not necessarily be a double feed detection sensor, and may be a sensor for acquiring sheet information (position information and presence/absence information), or may be a sensor other than ultrasonic sensors. For example, the sensor unit may be a sensor including a light emitting unit including a light emitting diode (LED), and a light receiving unit. In such a sensor, the light receiving unit receives light emitted from the light emitting unit and reflected by a sheet to detect the sheet position. Also in this case, similar effects can be acquired by applying aspects of the present invention.

Although a copying machine has been described as an example of an image forming apparatus in the above exemplary embodiment, aspects of the present invention are not limited thereto. For example, aspects of the present invention may be applied to an image reading device such as a scanner, an image forming apparatus such as a printer and a facsimile, or another image forming apparatus such as a multifunction peripheral that combines functions of the these devices. Similar effects can be acquired by applying aspects of the present invention to the above-described image reading device or the above-described image forming apparatus.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-037026, filed Feb. 26, 2015, which is hereby incorporated by reference herein in its entirety.

What is claimed is:

1. A sheet conveyance device comprising:
a sheet stacking portion on which sheets are stacked;
a sheet feeder for feeding sheets stacked on the sheet stacking portion;
a conveyance guide disposed on a downstream side of the sheet feeder in a sheet conveyance direction; and
a sensor module disposed under the conveyance guide, wherein the sensor module includes:
a sensor configured to detect a sheet conveyed along the conveyance guide via an opening formed on the conveyance guide;
a control circuit board on which the sensor and an element electrically connected to the sensor are provided; and
a protection member provided to cover the element,
wherein the protection member includes a hole portion, and
wherein the sensor is inserted into the hole portion to penetrate through the hole portion.

2. The sheet conveyance device according to claim 1, further comprising a separation unit configured to separate, one-by-one, the sheets fed by the sheet feeder,
wherein the opening is formed on the downstream side of the separation unit in the sheet conveyance direction.

3. The sheet conveyance device according to claim 1, wherein the sensor module is a double feed detection sensor for detecting double-fed sheets.

4. The sheet conveyance device according to claim 1, further comprising another sensor module disposed to face the sensor module across a sheet conveyance path, and used in conjunction with the sensor module.

5. The sheet conveyance device according to claim 1, wherein the protection member includes an abutting portion configured to abut an upper surface of the control circuit board, and a claw-shaped engaging portion configured to engage with an under surface of the control circuit board, and
wherein the protection member is attached to the control circuit board using the abutting portion and the claw-shaped engaging portion.

6. The sheet conveyance device according to claim 1, wherein the hole portion of the protection member has an approximately identical shape to an outer circumferential surface of the sensor.

7. The sheet conveyance device according to claim 1, wherein the protection member includes a wall portion protruding from an upper surface of the protection member.

8. The sheet conveyance device according to claim 7, wherein the wall portion is disposed at an outer position than the opening of the conveyance guide when the protection member is viewed from above.

9. A sheet conveyance device comprising:
a sheet stacking portion on which sheets are stacked;
a sheet feeder for feeding sheets stacked on the sheet stacking portion;
a conveyance guide disposed on a downstream side of the sheet feeder in a sheet conveyance direction; and
a sensor module disposed under the conveyance guide, wherein the sensor module includes:
a sensor configured to detect a sheet conveyed along the conveyance guide, via an opening formed on the conveyance guide;
a control circuit board on which the sensor and an element electrically connected to the sensor are provided; and
a protection member provided to cover the element,
wherein the protection member includes a hole portion, and
wherein positioning of the protection member with respect to the control circuit board is performed using the hole portion of the protection member and an outer circumferential surface of the sensor.

10. The sheet conveyance device according to claim 9, further comprising a separation unit configured to separate, one-by-one, the sheets fed by the sheet feeder,
wherein the opening is formed on the downstream side of the separation unit in the sheet conveyance direction.

11. The sheet conveyance device according to claim 9, wherein the sensor module is a double feed detection sensor for detecting double-fed sheets.

12. The sheet conveyance device according to claim 9, further comprising another sensor module disposed to face the sensor module across a sheet conveyance path, and used in conjunction with the sensor module.

13. The sheet conveyance device according to claim 9, wherein the protection member includes an abutting portion configured to abut an upper surface of the control circuit board, and a claw-shaped engaging portion configured to engage with an under surface of the control circuit board, and
wherein the protection member is attached to the control circuit board using the abutting portion and the claw-shaped engaging portion.

14. The sheet conveyance device according to claim 9, wherein the hole portion of the protection member has an approximately identical shape to an outer circumferential surface of the sensor.

15. The sheet conveyance device according to claim 9, wherein the protection member includes a wall portion protruding from an upper surface of the protection member.

16. The sheet conveyance device according to claim 15, wherein the wall portion is disposed at an outer position than the opening of the conveyance guide when the protection member is viewed from above.

17. An image reading device comprising:
a sheet conveyance device configured to convey a sheet; and
an image reader for reading image information on a sheet fed by a sheet feeder,
wherein the sheet conveyance device includes:
a sheet stacking portion on which sheets are stacked;
the sheet feeder for feeding sheets stacked on the sheet stacking portion;
a conveyance guide disposed on a downstream side of the sheet feeder in a sheet conveyance direction; and
a sensor module disposed under the conveyance guide, wherein the sensor module includes:

a sensor configured to detect a sheet conveyed along the conveyance guide, via an opening formed on the conveyance guide;

a control circuit board on which the sensor and an element electrically connected to the sensor are provided; and a protection member provided to cover the element, wherein the protection member includes a hole portion, and wherein the sensor is inserted into the hole portion to penetrate through the hole portion.

18. An image reading device comprising:

a sheet conveyance device configured to convey a sheet; and an image reader for reading image information on a sheet fed by a sheet feeder, wherein the sheet conveyance device includes:

a sheet stacking portion on which sheets are stacked;

the sheet feeder for feeding sheets stacked on the sheet stacking portion;

a conveyance guide disposed on a downstream side of the sheet feeder in a sheet conveyance direction; and a sensor module disposed under the conveyance guide, wherein the sensor module includes:

a sensor configured to detect a sheet conveyed along the conveyance guide, via an opening formed on the conveyance guide;

a control circuit board on which the sensor and an element electrically connected to the sensor are provided; and a protection member provided to cover the element, wherein the protection member includes a hole portion, and wherein positioning of the protection member with respect to the control circuit board is performed using the hole portion of the protection member and an outer circumferential surface of the sensor.

19. An image forming apparatus comprising:

an image forming unit configured to form an image on a recording medium; and a sheet conveyance device configured to convey a sheet, wherein the sheet conveyance device includes:

a sheet stacking portion on which sheets are stacked;

a sheet feeder for feeding sheets stacked on the sheet stacking portion;

a conveyance guide disposed on a downstream side of the sheet feeder in a sheet conveyance direction; and a sensor module disposed under the conveyance guide, wherein the sensor module includes:

a sensor configured to detect a sheet conveyed along the conveyance guide, via an opening formed on the conveyance guide;

a control circuit board on which the sensor and an element electrically connected to the sensor are provided; and a protection member provided to cover the element, wherein the protection member includes a hole portion, and wherein the sensor is inserted into the hole portion to penetrate through the hole portion.

20. An image forming apparatus comprising:

an image forming unit configured to form an image on a recording medium; and a sheet conveyance device configured to convey a sheet, wherein the sheet conveyance device includes:

a sheet stacking portion on which sheets are stacked;

a sheet feeder for feeding sheets stacked on the sheet stacking portion;

a conveyance guide disposed on a downstream side of the sheet feeder in a sheet conveyance direction; and a sensor module disposed under the conveyance guide, wherein the sensor module includes:

a sensor configured to detect a sheet conveyed along the conveyance guide, via an opening formed on the conveyance guide;

a control circuit board on which the sensor and an element electrically connected to the sensor are provided; and a protection member provided to cover the element, wherein the protection member includes a hole portion, and wherein positioning of the protection member with respect to the control circuit board is performed using the hole portion of the protection member and an outer circumferential surface of the sensor.

21. A sensor module for acquiring information about a conveyed sheet, the sensor module comprising:

a sensor configured to detect a conveyed sheet;

a control circuit board on which the sensor and an element electrically connected to the sensor are provided; and a protection member provided to cover the element, wherein the protection member includes a hole portion, and wherein the sensor is inserted into the hole portion to penetrate through the hole portion.

22. A sensor module for acquiring information about a conveyed sheet, the sensor module comprising:

a sensor configured to detect a conveyed sheet;

a control circuit board on which the sensor and an element electrically connected to the sensor are provided; and a protection member provided to cover the element, wherein the protection member includes a hole portion, and wherein positioning of the protection member with respect to the control circuit board is performed using the hole portion of the protection member and an outer circumferential surface of the sensor.

* * * * *